INVENTOR:
JEAN-JACQUES G. MAYER

BY

Karl G. Ross

AGENT

JEAN-JACQUES G. MAYER
INVENTOR.

BY Karl G. Ross

AGENT

JEAN-JACQUES G. MAYER
INVENTOR.

BY

Karl G. Ross
AGENT

Sept. 5, 1967 JEAN-JACQUES G. MAYER 3,340,506

DATA-PROCESSING SYSTEM

Filed March 10, 1964 4 Sheets-Sheet 4

JEAN-JACQUES G. MAYER
INVENTOR.

BY

Karl G. Ross
AGENT

United States Patent Office
3,340,506
Patented Sept. 5, 1967

3,340,506
DATA-PROCESSING SYSTEM

Jean-Jacques G. Mayer, Paris, France, assignor to Société Nouvelle d'Electronique et de la Radio-Industrie, Paris, France, a corporation of France Filed Mar. 10, 1964, Ser. No. 350,711
Claims priority, application France, Mar. 20, 1963, 928,616
11 Claims. (Cl. 340—146.1)

ABSTRACT OF THE DISCLOSURE

Data-processing system wherein a logic circuit derives from a memory input data, including a plurality of binary digits A, B, etc. to generate an output signal in the form of a single binary digit S representing the function $f$ (A, B . . . ), the correctness of S being determined by a test circuit which modifies the operation of the logic circuit to produce instead the Boulean inversion $$\bar{f}(\bar{A}, \bar{B} \ldots) = \bar{S}$$

which must be the digital complement of S; upon correct successive generation of S and $\bar{S}$ in a single operating cycle a comparator emits a verification signal.

My present invention relates to a data-processing system in which binary values, stored temporarily or permanently in a suitable memory, serve as input signals for a logic circuit which performs calculating operations on the data represented by these signals and converts them into binary digits adapted to be further processed, stored, recorded or otherwise utilized.

Generally, a computer comprises a considerable number of digital logic circuits, each such circuit including one or more functional units adapted to perform either the "AND" or the "OR" function corresponding to multiplicative or additive combination of input signals on the basis of Boolean algebra. An error occurring in any of these circuits will, of course, falsify the result so that care must be taken to minimize the possibility of such errors and to detect them if they occur. Statistically, these errors may be predicted in terms of their rate of occurrence within a given time interval or in terms of probability of occurrence during any cycle of operations. It is this latter probability to which designers of computers have addressed themselves with a view to preventing such errors from adversely affecting the calculation.

One of the methods heretofore adopted to this and is the provision of a certain redundancy in circuitry to provide alternate paths over which the same signals can be conveyed for identical processing, with comparison of the outputs of the several paths and vertification of the result if all or the majority of them give concurrent readings. Thus, with three identically constructed logic circuits for each digit, connected in parallel, the signal to be transmitted or preserved for further utilization will have the digital value registered in at least two of the three outputs thereof, as determined by a discriminator circuit which is of relatively complex construction and must itself operate with a high degree of reliability if the introduction of additional errors at this point is to be avoided. Even so, however, the result is not invariably correct since the simultaneous occurrence of two or more errors may upset the operation of the system. Naturally, the tripling of the circuit elements greatly increases the initial expense as well as maintenance cost and space requirements.

It is, therefore, the general object of my invention to provide simplified means in such system for verifying the correctness of computed digits with only a minimum of auxiliary circuitry.

Another object is to provide simple and, therefore, inherently reliable circuit means for carrying out such verification.

The invention realizes these objects by making use of a principle of Boolean algebra which relates to the complement $\bar{S}$ of a binary expression $S=f(A, B, C \ldots)$, wherein the function $f$ consists of additive and/or multiplicative combinations of the several input variables A, B, C etc., this principle stating that $\bar{S}=\bar{f}(\bar{A}, \bar{B}, \bar{C} \ldots)$ where $\bar{A}$, $\bar{B}$, $\bar{C}$ etc. are the binary complements or inversions of the variables A, B, C and so forth while $\bar{f}$ differs from $f$ by the replacements of all additions by multiplications and vice versa. Thus, if $S=AB+CD$, then $\bar{S}=(\bar{A}+\bar{B})(\bar{C}+\bar{C})$. Thus, with the aid of relatively uncomplicated circuit means, it is possible to modify the input data of a logic circuit in such manner that the resulting binary digit is converted into its complement, the invention providing means for effecting this conversion within a single cycle of an associated timer so that both the original digit and its complement are produced in the course of that cycle if the logic circuit operates properly. A simple discriminator circuit, controlled by the timer, matches the original digit and the subsequent one to determine if the two are complementary; if so, a verification signal is produced which permits utilization of either of these two paired digits (e.g. by concurrent transmission to a utilization device) and, if desired, informs the input memory that a new set of data may be made available for delivery to the logic circuit in the next timer cycle.

To facilitate comparison between the two consecutive signals occurring in the first and the second half of a timer cycle, the first signal may be stored for at least the major part of that cycle so as to be available when the second signal arrives. Since, however, any binary number and its complement must always add up to the numerical value 1, the comparison may also be made with the aid of a flip-flop circuit which responds to the output pulses of the logic circuit and, if tripped exactly once during a cycle, releases the verification signal.

Generally, in conformity with the inversion principle set forth above, the operation of the data-modifying means in the input of the logic circuit will involve replacement of all the variables A, B, C, etc. by their complements $\bar{A}$, $\bar{B}$, $\bar{C}$ and so on, concurrently with a switchover from one type of functional signal to another for changing from AND to OR functions and vice versa. The logic circuit, in such case, will include convertible conjunctive units, such as AND/OR and OR/AND networks, switchable from one mode of algebraic operation to the other. The changeover from the original variables to their complements may be carried out by the actuation of inverter circuits, inserted in the conductors which convey the corresponding signals to the logic circuit, or, if the memory itself has facilities for the storage of each information signal together with its own complement, by the consecutive selection of first one and then the other of these paired signals. The latter arrangement includes the memory itself in the verification system, albeit at the expense of an enlargement of its storage capacity.

There are, however, certain instances in which the output digit may be inverted by a data-modifying operation which does not involve both the complementing of the input variables and the switching of the functional units. Let us consider, for example, the function $S=AB+AC+BC=A(B+C)+BC$. To find the complement $\bar{S}$, we must modify this function—according to the aforesaid principle—to give it the form $(\bar{A}+\bar{B}\bar{C})(\bar{B}+\bar{C})$. Under the rules of Boolean algebra, however, the last-mentioned expression is equal to $\bar{A}\bar{B}+\bar{A}\bar{C}+\bar{B}\bar{C}$, hence in this case it suffices to invert the numerical input variables without changing the functional signals. If, on the other hand, $f$ is a symmetrical function in A, $\overline{A}$, B, $\overline{B}$ and so forth, complementing of the variables becomes redundant; thus, with $S=A\overline{B}+\overline{A}B$, a switching to $(A+\overline{B})(\overline{A}+B)$ produces the complement $\overline{S}$.

The invention will be described in greater detail with reference to the accompanying drawing in which.

Figure 1:
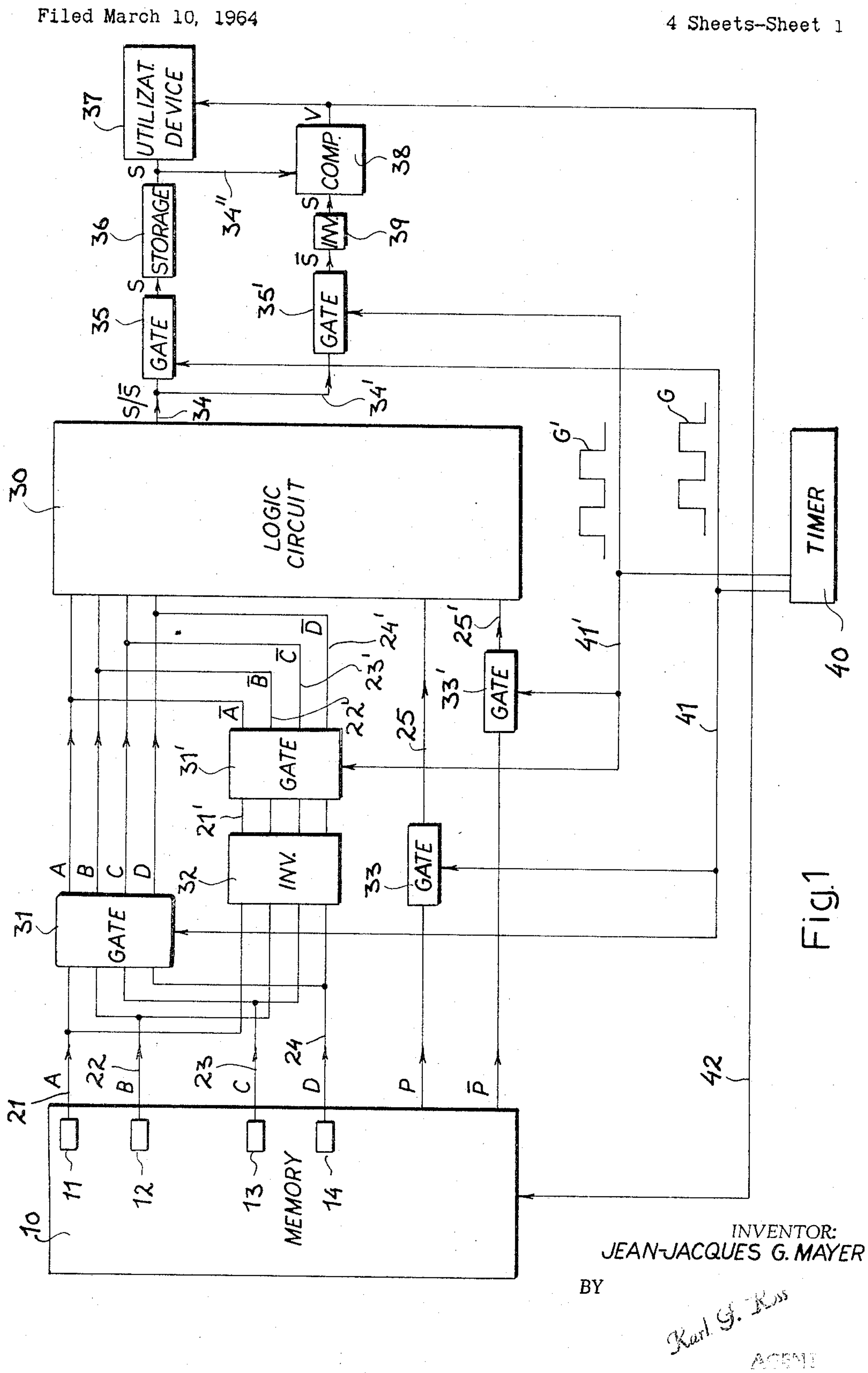
FIG. 1 is a circuit diagram of part of a data-processing system incorporating a test circuit for the verification of the operation of an associated logic circuit in accordance with this invention.
Figure 2:
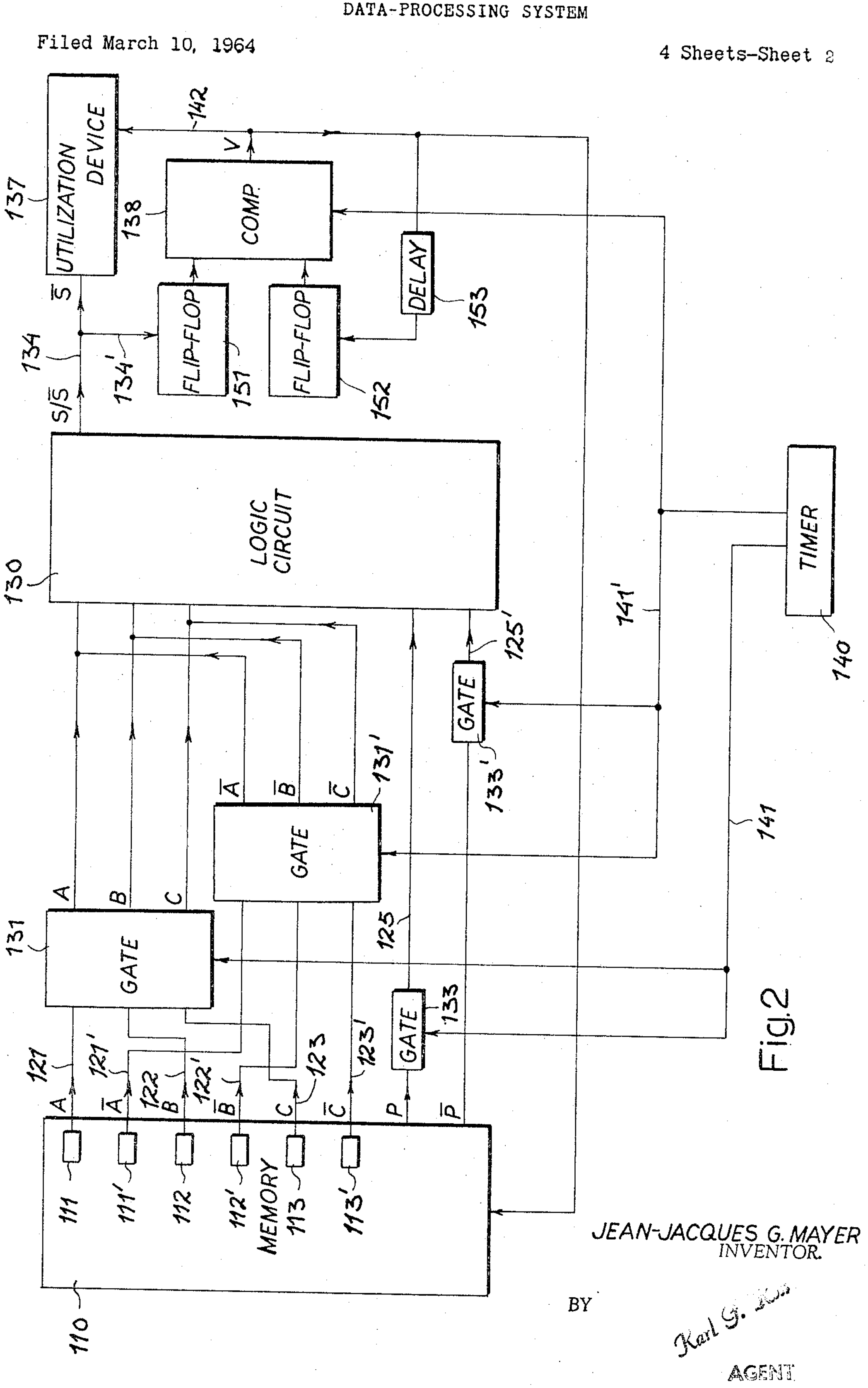
FIG. 2 is a circuit diagram similar to FIG. 1, showing a modification.
Figure 3:
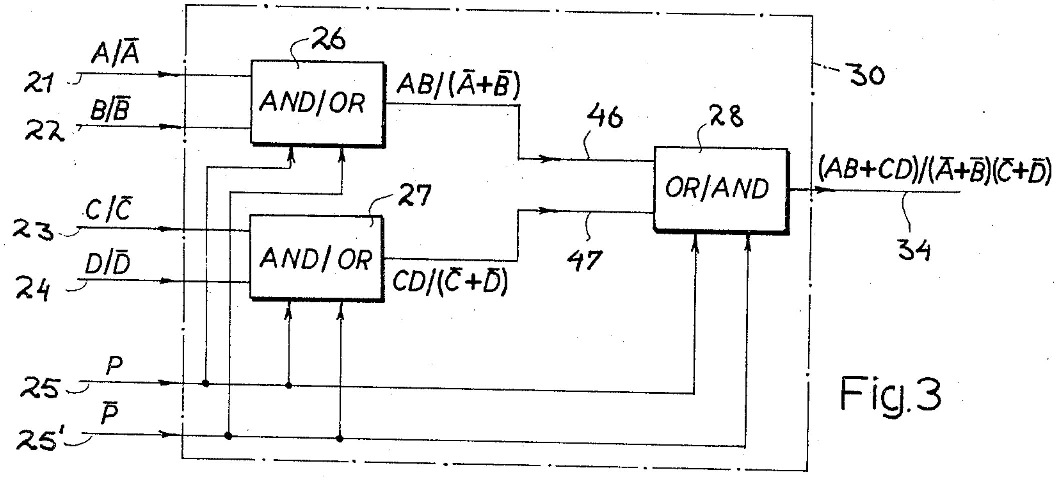
FIG. 3 shows details of a logic circuit typical of those shown in FIGS. 1 and 2.
Figure 4:
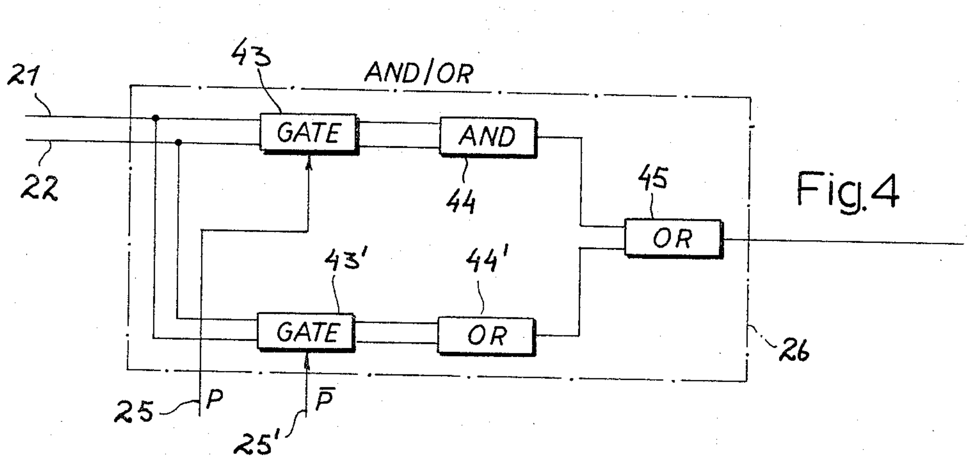
Figure 5:
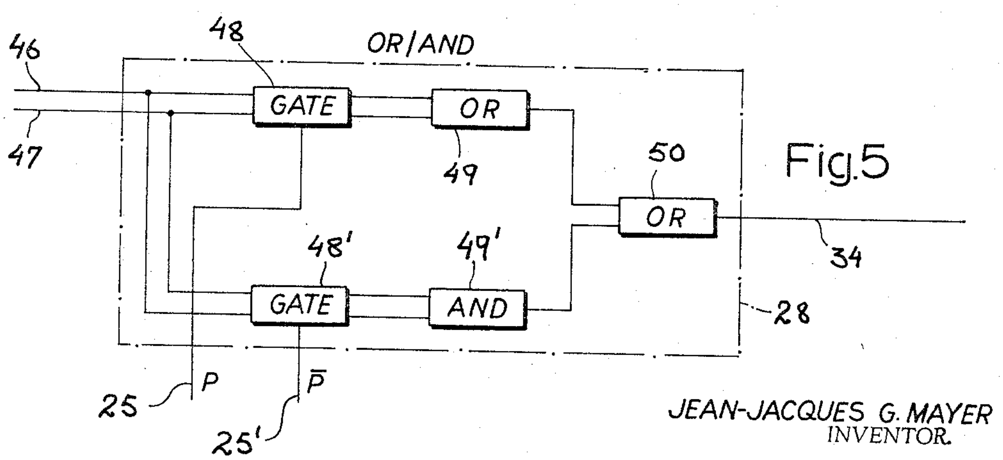
Figure 6:
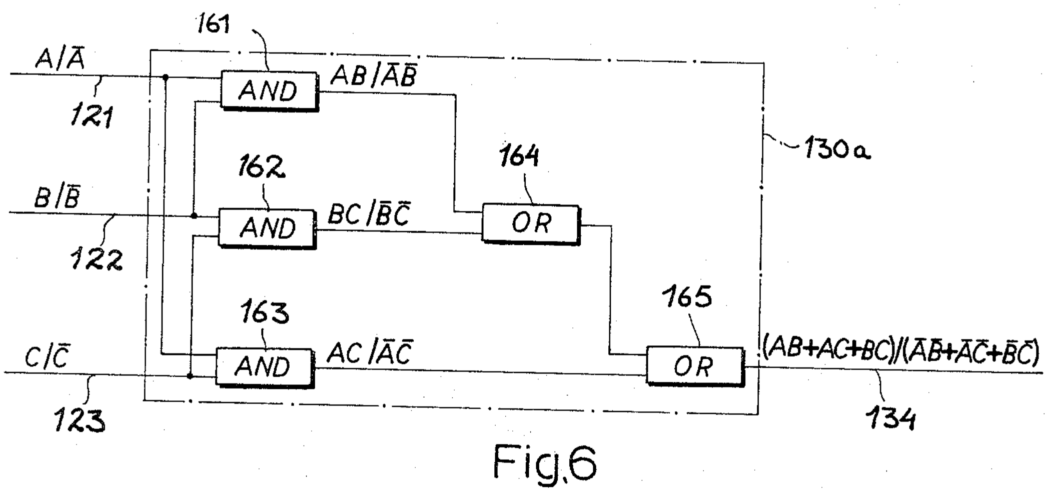
Figure 7:
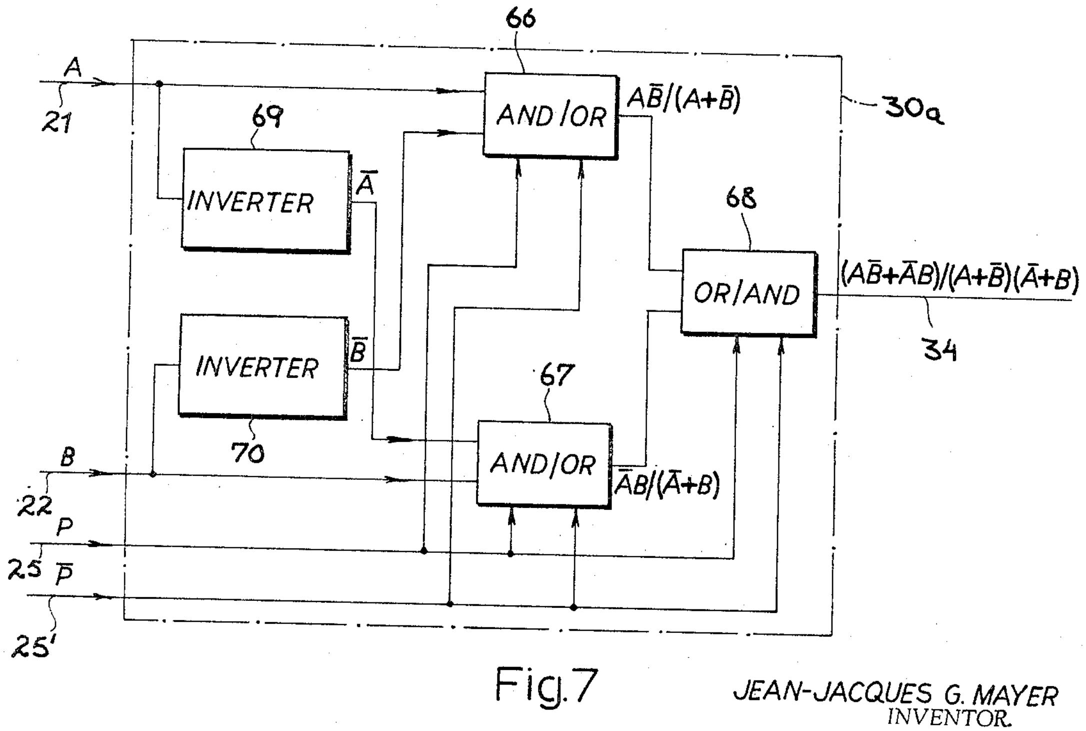

FIGS. 4 and 5 diagrammatically illustrate two switchable functional units adapted to be used in the logic circuit of FIG. 3; and FIGS. 6 and 7 diagrammatically show two special logic circuits adapted to be tested in the systems of FIGS. 1 and 2 with only partial modification of their input data.

The system shown in FIG. 1 comprises an input register or memory 10 with a set of binary storage elements 11, 12, 13, 14 (representative of any number of such elements) having respective conductors 21, 22, 23, 24 extending therefrom toward a logic circuit 30, two further conductors being shown at 25 and 25'. The conductors 21–24, carrying information signals designated A, B, C and D, pass through a gate 31 while other leads 21', 22', 23' and 24', branching off these conductors ahead of the gate 31, traverse an inverter circuit 32 in series with a gate 31'; inverter 32 is designed to convert the signals A–D into their respective complements $\overline{A}$, $\overline{B}$, $\overline{C}$, $\overline{D}$. Lead 25, carrying a functional signal P, and lead 25', carrying a functional signal $\overline{P}$, have respective gates 33, 33' inserted therein.

Logic circuit 30, which in a simple case may be constructed as described hereinafter with reference to FIG. 3, has an output conductor 34 which carries the binary output signal S or $\overline{S}$ and from which, ahead of a gate 35 operable to pass only the signal S, a lead 34' branches off to convey the signal $\overline{S}$ through another gate 35'. Beyond gate 35 there are provided, in cascade, a storage circuit 36 and a utilization device 37 for the signal S. Another lead 34'' branches off the lead 34 beyond the storage circuit 36 and terminates at one input of a comparison circuit 38 whose other input, connected to lead 34', receives the signal $\overline{S}$ from gate 35' by way of an inverter 39.

A timer 40 produces two interleaved trains of unblocking pulses G, G' on a pair of bus bars 41, 41' respectively connected to gates 31, 33, 35 and 31', 33', 35'. Comparator 38 delivers a verification signal V to a conductor 42 upon detecting a coincidence between the two signals applied to it via leads 34' and 34'', conductor 42 terminating at the device 37 and at the memory 10 for initiating utilization of signal S and for stepping the memory by either switching the conductors 21–24 to different storage elements thereof or conditioning the elements 11–14 for the registration of a new set of digital values.

For an explanation of the mode of operation of the system of FIG. 1, let it be assumed, by way of illustration, that the circuit 30 has the configuration shown in FIG. 3 designed to produce the signal $S=AB+CD$ and, alternately, its complement $\overline{S}=(\overline{A}+\overline{B})(\overline{C}+\overline{D})$. It comprises, for this purpose, three convertible conjunctive units 26, 27 and 28, units 26 and 27 being AND/OR networks connected to input leads 21, 22 and 23, 24, respectively, whereas unit 28 is an OR/AND network connected to the output leads 46, 47 of networks 26, 27. Each of these networks is provided with a pair of control terminals respectively connected to switching conductors 25 and 25'. Network 28 works into the output lead 34 of logic circuit 30.

In the first half of an operating cycle of timer 40 (FIG. 1), a pulse G on bus bar 41 opens the gates 31, 33 and 35, gates 31', 33' and 35' being closed. In the presence of signal P on lead 25, networks 26 and 27 are in their AND condition while network 28 performs the OR function. The variables A, B, C and D on conductors 21, 22, 23 and 24 give rise to signals AB and CD, respectively, in the outputs of units 26 and 27 so that the desired signal S appears on the lead 34. If, for example, A, B, and C each equal 1 while D equals 0, $AB=1$ while $CD=0$ so that $S=1$. This signal is now stored on the circuit 36, the load 37 being not conditioned to receive this signal in the absence of verification signal V.

In the second half of the timer cycle the pulse G' opens the gates 31', 33' and 35' while the gates 31, 33 and 35 are closed. Pulse $\overline{P}$, appearing on conductor 25' in lieu of the pulse P on lead 25, switches the units 26, 27 and 28 into their alternate operating condition so that units 26, 27 act as OR networks while unit 28 performs the AND function. With the complementary signals $\overline{A}$, $\overline{B}$, $\overline{C}$ and $\overline{D}$ respectively present on leads 21, 22, 23 and 24, the output signals of units 26 and 27 have the form $\overline{A}+\overline{B}$ and $\overline{C}+\overline{D}$, respectively, so that the proper complementary digit $\overline{S}$ is transmitted over output lead 34. Thus with the values previously assumed, $\overline{A}=\overline{B}=\overline{C}=0$ whereas $\overline{D}=1$, hence $\overline{A}+\overline{B}=0$ and $\overline{C}+\overline{D}=1$ whence $\overline{S}=0$, a correct inversion of $S=1$. The signal $\overline{S}$, delivered via gate 35' to inverter 39 where it is reconverted to signal S, is now matched with the stored signal S from circuit 36 by the comparator 38 which produces the verification signal V to condition the load 37 for reception of the stored signal.

If one of the units 26–28 had failed to function properly during either half-cycle of timer 40, comparator 38 would have determined the nonidentity of the signals supplied to it and would not have produced the signal V so that device 37 would have remained nonreceptive and the memory 10 would not have been advanced. Thus, transmission of the same set of data to the logic circuit 30 would have been repeated in the next timer circuit, and possibly thereafter, until the malfunction had been eliminated.

The AND/OR network 26 has been illustrated in detail in FIG. 4 which, of course, is also representative of the network 27. It comprises a pair of gates 43 and 43', both connected in parallel to the leads 21 and 21', an AND circuit 44 beyond gate 43, an OR circuit 44' beyond gate 43', and an OR circuit 45 receiving the outputs of circuits 44 and 44'. The gates 43 and 43' have control terminals connected to conductors 25 and 25' for unblocking by signals P and $\overline{P}$, respectively.

The OR/AND network 28, as shown in FIG. 5, similarly comprises a pair of gates 48 and 48', multipled across the leads 46 and 47, an OR circuit 49 beyond gate 48, an AND circuit 49' beyond gate 48', and an OR circuit 50 receiving the outputs of circuits 49 and 49'. The gates 48 and 48' have control terminals connected to conductors 25 and 25', in parallel with gates 43 and 43' of networks 28 and 28', for unblocking by the respective signals P and $\overline{P}$ thereof.

Instead of multipling the two sets of input leads 21–24 and 21'–24' of the logic circuit 30 to a single set of storage elements 11–14 in the memory 10, as shown in FIG. 1, it is possible to use separate sets of storage elements with elimination of the inverter 32 if a sufficiently large register is available. This has been illustrated in FIG. 2 where the memory 110 has two sets of storage elements 111, 112, 113 etc. for signals A, B, C . . . and 111', 112', 113' for their complements $\overline{A}$, $\overline{B}$, $\overline{C}$ . . . , the two sets of leads 121, 122, 123 and 121', 122', 123' extending from these elements through respective gates 131, 131' and merging with each other before reaching the logic circuit 130. Conductors 125, 125' for the functional signals P, $\overline{P}$ include gates 133, 133' as in the preceding embodiment. These gates are controlled, as before, by leads 141, 141' from a timer 140.

FIG. 2 also illustrates a somewhat different type of discriminator circuit in the output of logic circuit 130. The conductor 134 emanating from the logic circuit leads directly to the load 137 while a branch 134' thereof energizes a flip-flop circuit 151 whose output is delivered to the comparator 138 along with that of a second flip-flop circuit 152. The vertification signal V on the output lead 142 of comparator 138 is again applied to the utilization device 137 and to the memory 110 but, in addition, is also fed via a delay circuit 153 to the flip-flop 152 which acts as a pacemaker for the counting flip-flop 151. Thus, the signal pulse V trips the flip-flop 152 after each correct verification, at the end of any timer cycle, whereas one of the two paired digital signals in such cycle (i.e. the one which represents the value 1 in a properly matched pair and therefore has the form of a pulse of predetermined polarity) trips the counting flip-flop 151 so that the two flip-flops are in step at the end of any cycle in which the logic circuit 130 performed correctly. The comparison circuit 138 then produces the signal pulse V, under the control of timer lead 141', concurrently with the appearance of output signal $\overline{S}$ on lead 134 so that it is this latter signal which is utilized at the device 137.

If, however, the flip-flop 151 is not tripped during a timer cycle, owing to the erroneous appearance of two successive digits of value 0, or is stepped twice by reason of two pulses of value unity, the two circuits 151, 152 will be out of synchronism when the comparator 138 is triggered by the timer pulse G' (see FIG. 1) so that no vertification signal V appears on conductor 142; thus, the pacemaker circuit 152 does not advance at the end of such cycle and the counting circuit 151, if correctly tripped a single time during the next cycle, gets back into step with it whereupon the system returns to normal operation.

In FIG. 6 I have shown a special logic circuit 130*a* which may be used in, for example, the system of FIG. 2 to produce the function $S=AB+AC+BC$. It comprises three AND circuits 161, 162, 163 connected to leads 121, 122, 123 to receive the combinations of signals (A, B), (B, C) and (A, C) therefrom, respectively; AND circuits 161 and 162 work into an OR circuit 164 whose output, together with that of AND circuit 163, is fed to another OR circuit 165 whereby the aforestated digital signal S is developed on output conductor 134. As explained above, the inverted signal $\overline{S}$ has the form $\overline{AB}+\overline{AC}+\overline{BC}$ and can therefore be produced by simple substitution of the complements $\overline{A}$, $\overline{B}$, $\overline{C}$ for the original signals A, B, C on leads 121, 122 and 123, there being no need for modifying the operation of the conjunctive circuits 161–165. Thus the functional leads 125, 125' (or 25, 25' if the overall system is that of FIG. 1) may be suppressed in this particular case.

In FIG. 7, conversely, I show a special logic circuit 30*a* designed to yield the symmetrical digital signal $S=(A+\overline{B})(\overline{A}+B)$. This circuit, whose input leads are represented by the conductors 21, 22, 25 and 25' of FIG. 1, comprises two AND/OR networks 66, 67 delivering their outputs to an OR/AND network 68 and receiving their input information from leads 21 and 22 both directly and by way of a pair of inverters 69, 70. The three functional units 66, 67 and 68 are controlled by leads 25, 25' for switching in the manner explained for the analogous networks 26, 27 and 28 of FIG. 3. Initially, in the presence of signal P on lead 25, network 66 performs the AND function on signal A from lead 21 and signal $\overline{B}$ from inverter 70 while network 67 operates in similar manner on signal B from lead 22 and signal $\overline{A}$ from inverter 69, the result being the desired digital value S on the output lead 34 of unit 68 which behaves as an AND circuit. In the alternate condition of the circuit, brought about by the appearance of signal $\overline{P}$ on lead 25', networks 66 and 67 perform the OR function on the same combinations of input signals while network 68 acts as an AND circuit to give rise to the result $\overline{S}$. It will be apparent that in this case there is no need for complementing the input signals A and B outside the logic circuit itself.

It will thus be seen that I have disclosed a system for testing the performance of a logic circuit by relatively simple means, with a minimum of redundancy or duplication, and that a high degree of reliability (100% in the case of a single error per cycle) can be achieved. In particular, the use of essentially the same transmission paths for two related but distinct signals, of which one necessarily will have to be a pulse of unit magnitude, eliminates the possibility of erroneous zero readings due to open connections or inoperative circuit elements, this possibilty being not ruled out in the prior systems with parallel paths for the transmission of identical signals. The logic circuit itself consists only of uncomplicated algebraic units without storage function, such as AND circuits, OR circuits and (e.g. as illustrated in FIG. 7) inverters, and the associated test elements are also of simple construction. Although certain of these elements (e.g. gates) have been illustrated as separate entities, for the sake of clarity, it will be apparent that some of these elements (both within the logic circuit itself and in the associated test circuit) could be combined into single units for greater compactness. Naturally, the logic circuits specifically described in conjunction with FIGS. 3–7 are merely illustrative of a wide variety of such circuits usable in the systems of FIGS. 1 and 2 which in turn may be altered in various ways, as by the interchange of compatible features (e.g. substitution of the memory unit or storage register 10 for the unit 110 or vice versa). These and other modifications, readily apparent to persons skilled in the art, are therefore considered embraced within the spirit and scope of my invention as defined in the appended claims.

I claim:

1. In a data-processing system provided with a memory for the storage of a set of input data including at least two binary information signals A, B and a logic circuit for the conversion of a combination of said signals into a single binary digit $S=f(A,B)$ the combination therewith of a test circuit for determining the correct performance of said logic circuit, said test circuit comprising:

a plurality of input leads extending from said memory to said logic circuit for supplying said data thereto;

data-modifying means connected to said input leads for altering the operation of said logic circuit to generate a function $\overline{f}(\overline{A}, \overline{B})$ representing the Boolean inversion of $f(A, B)$ whereby said binary digit S is converted into its complement $\overline{S}$;

timer means coupled with said data-modifying means for effecting consecutive application of said data from said memory to said logic circuit in the unoperated and the operated state of said data-modifying means whereby a given set of data give rise to an original binary digit S and its complement $\overline{S}$ in immediate succession;

and discriminator means in the input of said logic circuit operable under the control of said timer means for comparing two consecutive output signals from said logic circuit and producing a verification signal upon said consecutive signals being mutually complementary.

2. In a data-processing system provided with a memory for the storage of a set of input data including at least two binary information signals A, B and a logic circuit for the conversion of a combination of said signals into a single binary digit $S=f(A, B)$ to be transmitted to a utilization device, the combination therewith of a test circuit for determining the correct performance of said logic circuit, said test circuit comprising:

a plurality of input leads extending from said memory to said logic circuit for supplying said data thereto;

data-modifying means connected to said input leads for altering the operation of said logic circuit to generate a function $\bar{f}(\bar{A}, \bar{B})$ representing the Boolean inversion of $f(A, B)$ whereby said binary digit S is converted into its complement $\bar{S}$;

timer means coupled with said data-modifying means for effecting consecutive application of said data from said memory to said logic circuit in the unoperated and the operated state of said data-modifying means whereby a given set of data give rise to an original binary digit S and its complement $\bar{S}$ in immediate succession;

discriminator means in the output of said logic circuit operable under the control of said timer means for comparing two consecutive output signals from said logic circuit and producing a verification signal upon said consecutive signals being mutually complementary;

and blocking means in said output connected to said comparison means for deactivation by said verification signal to enable transmission of one of said consecutive signals to the utilization device.

3. A data-processing system comprising a memory for the storage of input data including a set of binary information signals and a pair of functional signals;

a logic circuit for the conversion of said data into a binary digit;

first conductor means connecting said memory with the input of said logic circuit for supplying said information signals thereto;

second conductor means connecting said memory with the input of said logic circuit for supplying said functional signals thereto;

functional circuit means in said logic circuit selectively operable in response to said functional signals for performing an AND function and an OR function, respectively, on a combination of variables represented by information signals applied thereto;

data-modifying means in at least one of said conductor means operable to convert said binary digit into its complement;

timer means coupled with said data-modifying means for effecting consecutive application of said data from said memory to said logic circuit in the unoperated and the operated state of said data-modifying means whereby a given set of data give rise to an original binary digit and its complement in immediate succession;

and discriminator means in the output of said logic circuit operable under the control of said timer means for comparing two consecutive output signals from said logic circuit and producing a verification signal upon said consecutive signals being mutually complementary.

4. A system as defined in claim 3 wherein said first conductor means comprises two sets of leads extending from said memory and merging at the input of said logic circuit for respectively supplying original and complementary signals thereto, said data-modifying means including respective gate means in said first and second sets of leads for alternately blocking and unblocking same.

5. A system as defined in claim 4 wherein one of said sets of leads includes signal-inverting means, said memory being provided with a single set of storage elements for information data multiplied to said two sets of leads.

6. A system as defined in claim 4 wherein said memory is provided with two sets of storage elements for said original and complementary signals, respectively, said sets of leads being each connected to one of said sets of storage elements.

7. A system as defined in claim 3 wherein said discriminator means includes storage means for preserving an original binary digit over at least the major part of an operating cycle of said timer means and comparison means for matching said original digit with its complement received later in said cycle.

8. A system as defined in claim 3 wherein said discriminator means includes flip-flop means connected to receive from said logic circuit a first pulse corresponding to an original binary digit during a first half of a cycle of said timer means and a second pulse corresponding to a complementary binary digit during a second half of a cycle of said timer means, and counting means responsive to a single tripping of said flip-flop means by such pulse during any one cycle for producing said verification signal at the end of the cycle.

9. A data-processing system comprising a memory for the storage of input data including a set of binary information signals and a pair of functional signals;

a logic circuit for the conversion of said data into a binary digit;

first conductor means connecting said memory with the input of said logic circuit for supplying said information signals thereto;

second conductor means connecting said memory with the input of said logic circuit for supplying said functional signals thereto;

functional circuit means in said logic circuit selectively operable in response to said functional signals for performing an AND function and an OR function, respectively, on a combination of variables represented by information signals applied thereto;

data-modifying means in each of said conductor means operable to replace each of said information signals by a complementary signal concurrently with a switching from one of said functional signals to the other, thereby converting said binary digit into its complement;

timer means coupled with said data-modifying means for effecting consecutive application of said data from said memory to said logic circuit in the unoperated and the operated state of said data-modifying means whereby a given set of data give rise to an original binary digit and its complement in immediate succession;

and discriminator means in the output of said logic circuit operable under the control of said timer means for comparing two consecutive output signals from said logic circuit and producing a verification signal upon said consecutive signals being mutually complementary.

10. A data-processing system comprising a memory for the storage of input data including a set of binary information signals and a pair of functional signals;

a logic circuit for the conversion of said data into a binary digit to be transmitted to a utilization device;

first conductor means connecting said memory with the input of said logic circuit for supplying said information signals thereto;

second conductor means connecting said memory with the input of said logic circuit for supplying said functional signals thereto;

functional circuit means in said logic circuit selectively operable in response to said functional signals for performing an AND function and an OR function, respectively, on a combination of variables represented by information signals applied thereto;

data-modifying means in at least one of said conductor means operable to convert said binary digit into its complement;

timer means coupled with said data-modifying means for effecting consecutive application of said data from said memory to said logic circuit in the unoperated and the operated state of said data-modifying means whereby a given set of data give rise to an original binary digit and its complement in immediate succession;

discriminator means in the output of said logic circuit operable under the control of said timer means for comparing two consecutive output signals from said logic circuit and producing a verification signal upon said consecutive signals being mutually complementary;

and blocking means in said output connected to said comparison means for deactivation by said verification signal to enable transmission of one of said consecutive signals to the utilization device.

11. A data-processing system comprising a memory for the storage of input data including a set of binary information signals and a pair of functional signals;

a logic circuit for the conversion of said data into a binary digit to be transmitted to a utilization device;

first conductor means connecting said memory with the input of said logic circuit for supplying said information signals thereto;

second conductor means connecting said memory with the input of said logic circuit for supplying said functional signals thereto;

functional circuit means in said logic circuit selectively operable in response to said functional signals for performing an AND function and an OR function, respectively, on a combination of variables represented by information signals applied thereto;

data-modifying means in each of said conductor means operable to replace each of said information signals by a complementary signal concurrently with a switching from one of said functional signals to the other, thereby converting said binary digit into its complement;

timer means coupled with said data-modifying means for effecting consecutive application of said data from said memory to said logic circuit in the unoperated and the operated state of said data-modifying means whereby a given set of data give rise to an original binary digit and its complement in immediate succession;

discriminator means in the output of said logic circuit operable under the control of said timer means for comparing two consecutive output signals from said logic circuit and producing a verification signal upon said consecutive signals being mutually complementary;

and blocking means in said output connected to said comparison means for deactivation by said verification signal to enable transmission of one of said consecutive signals to the utilization device.

References Cited

UNITED STATES PATENTS 3,237,157 2/1966 Higby ------------ 340—146.1

MALCOLM A. MORRISON, *Primary Examiner.*

M. J. SPIVAK, *Assistant Examiner.*